(12) United States Patent
Luvisotto et al.

(10) Patent No.: US 11,985,541 B2
(45) Date of Patent: May 14, 2024

(54) SYMBOL-LEVEL FRAGMENTATION AND PRE-EMPTION IN INDUSTRIAL WIRELESS COMMUNICATIONS

(71) Applicant: Hitachi Energy Ltd, Zurich (CH)

(72) Inventors: Michele Luvisotto, Västerås (SE); Zhibo Pang, Västerås (SE); Roger Jansson, Västerås (SE); Henrik Hellström, Sollentuna (SE); Marek Czepulonis, Cracow (PL)

(73) Assignee: Hitachi Energy Ltd, Zurich (CH)

( * ) Notice: Subject to any disclaimer, the term of this patent is extended or adjusted under 35 U.S.C. 154(b) by 0 days.

(21) Appl. No.: 17/162,636

(22) Filed: Jan. 29, 2021

(65) Prior Publication Data

US 2021/0243646 A1 Aug. 5, 2021

(30) Foreign Application Priority Data

Jan. 31, 2020 (EP) .................................... 20154825

(51) Int. Cl.
*H04W 28/06* (2009.01)
*G05B 19/418* (2006.01)
*H04L 5/00* (2006.01)

(52) U.S. Cl.
CPC ........ *H04W 28/06* (2013.01); *G05B 19/4185* (2013.01); *H04L 5/0007* (2013.01)

(58) Field of Classification Search
CPC .............. G05B 19/4185; H04W 28/06; H04W 72/1242; H04W 28/12; H04W 28/0289
See application file for complete search history.

(56) References Cited

U.S. PATENT DOCUMENTS

| 6,856,628 | B1 | 2/2005 | Bychowsky et al. |
| 7,558,269 | B2 | 7/2009 | Le Pennec et al. |
| 8,994,514 | B1* | 3/2015 | Juels ........................ G06K 7/01 |
| | | | 340/10.52 |
| 2002/0041592 | A1 | 4/2002 | Van Der Zee et al. |
| 2004/0004975 | A1* | 1/2004 | Shin ...................... H04L 47/365 |
| | | | 370/392 |
| 2008/0080557 | A1 | 4/2008 | Simkins |

(Continued)

FOREIGN PATENT DOCUMENTS

| CN | 108141424 A | 6/2018 |
| JP | H10117213 A | 5/1998 |

(Continued)

*Primary Examiner* — Syed Ali

(74) *Attorney, Agent, or Firm* — Slater Matsil, LLP

(57) ABSTRACT

A packet transmitter in a wireless communication system can perform a method for preparing transmission of physical layer protocol data units (PDUs). The method includes detecting a need to transmit a second stream of symbols having higher priority than a first stream of symbols currently being transmitted from the packet transmitter to a packet receiver. The first and second streams of symbols are each part of a respective physical layer PDU. A dedicated tag is inserted after a recent-most transmitted symbol of the first stream of symbols. The dedicated tag indicates that the first stream of symbols is subjected to pre-emption at the physical layer. Symbols of the second stream of symbols are inserted following the dedicated tag for transmission of the second stream of symbols to the packet receiver.

21 Claims, 5 Drawing Sheets

(56) References Cited

U.S. PATENT DOCUMENTS

| | | | |
|---|---|---|---|
| 2011/0065463 A1* | 3/2011 | Dadlani Mahtani | G06F 3/0233 |
| | | | 455/466 |
| 2012/0002680 A1 | 1/2012 | Naouri et al. | |
| 2013/0114576 A1* | 5/2013 | Kwon | H04W 28/18 |
| | | | 370/336 |
| 2013/0188620 A1* | 7/2013 | Dinan | H04L 5/0098 |
| | | | 370/336 |
| 2013/0343296 A1* | 12/2013 | Dinan | H04W 72/21 |
| | | | 370/329 |
| 2014/0289258 A1* | 9/2014 | Joshi | H04L 51/212 |
| | | | 707/741 |
| 2015/0181468 A1 | 6/2015 | Diachina et al. | |
| 2015/0365340 A1 | 12/2015 | Fukuda et al. | |
| 2018/0063749 A1 | 3/2018 | Islam et al. | |
| 2018/0063865 A1 | 3/2018 | Islam et al. | |
| 2019/0220703 A1* | 7/2019 | Prakash | G06V 10/95 |
| 2019/0289616 A1 | 9/2019 | Hampel et al. | |
| 2020/0146045 A1* | 5/2020 | Loehr | H04L 1/1812 |
| 2020/0287624 A1* | 9/2020 | Darbi | H04J 14/02 |

FOREIGN PATENT DOCUMENTS

| | | | |
|---|---|---|---|
| JP | 2013534103 A | 8/2013 | |
| JP | 2019526979 A | 9/2019 | |
| JP | 2019531643 A | 10/2019 | |
| WO | 2019058022 A1 | 3/2019 | |

* cited by examiner

SYMBOL-LEVEL FRAGMENTATION AND PRE-EMPTION IN INDUSTRIAL WIRELESS COMMUNICATIONS

CROSS-REFERENCE TO RELATED APPLICATIONS

This application claims priority to European Application No. 20154825.2, filed on Jan. 31, 2020, which application is hereby incorporated herein by reference.

TECHNICAL FIELD

Embodiments relate generally to symbol-level fragmentation and pre-emption in industrial wireless communications.

BACKGROUND

Industrial communication systems are typically required to deliver time-critical messages with real-time constraints, for instance emergency commands that must be quickly processed to protect people and equipment from harm in the case of failure. In addition to these messages, the same communication network is typically requested to handle also non-time-critical traffic, e.g. for firmware updates, system monitoring or diagnostic. Whilst time-critical messages are typically short and can be transmitted very quickly, non-time-critical messages might be considerably longer and occupy the communication channel for a long period of time. Consequently, there is a need for mechanisms in industrial communication networks to assign different priorities to messages and handling them accordingly.

For this reason, modern communication network standards support different priority levels for the exchange of packets between packet transmitters and packet receivers. One example of implementing packet priority is represented by the IEEE 802.11 Enhanced Distribution Coordination Function (EDCF). Accordingly, priority is implemented when different traffic flows are simultaneously requesting access to a wireless communication channel. If this leads to a collision inside the queue of the packet transmitter, the conflict is resolved by the higher priority packet always being first transmitted. Similar systems are being used also in industrial wireless standards such as WirelessHART (where HART is short for Highway Addressable Remote Transducer) and WIA-PA (short for Wireless networks for Industrial Automation—Process Automation).

Another mechanism to achieve differentiation in terms of priorities is to adapt the Inter Frame Space (IFS), which is defined as a waiting time after the completion of each transmission and it is naturally present in wireless networks based on the carrier-sense multiple access with collision avoidance (CSMA/CA) channel access scheme. Priority schemes can hence be implemented by assigning a shorter IFS to traffic classes with higher priority. Such a mechanism is used, for example, in WIA-PA.

All the mechanism previously described offer some way of prioritizing different packets and therefore enable a reduction of the overall latency for high-priority packets. However, these mechanisms also share limitations. As an example, after transmission of a packet has begun, there are not any mechanisms that can stop the packet from being transmitted, and new packets, even those with a higher priority of the one being transmitted, must thus wait for the transmission of the current packet to finish. If the lower-priority packet being transmitted is long in comparison to the higher-priority packet, a significant degradation in latency might be expected.

In wired industrial networks one way to overcome this issue is to implement a pre-emption strategy. Pre-emption in this context refers to that the transmission of a low-priority packet can be interrupted in favor of a higher-priority packet. One such example is represented in document U.S. Pat. No. 7,558,269 B2 according to which a pre-emption bit is, at the packet transmitter, inserted in the header of Internet protocol (IP) packets to let the packet receiver know that the current packet is being halted and transmission of a new higher-priority packet will soon begin.

However, there are not any similar mechanisms for wireless networks, and especially not for wireless industrial communication systems. Such a functionality is nonetheless needed in wireless communication systems supporting transmission of packets with different priorities, such as those used for the automation of power systems.

Hence, there is still a need for improved mechanisms for transmission and reception of packets with different priorities.

SUMMARY

Embodiments presented herein relate to a method, a packet transmitter, a computer program, and a computer program product for transmission of symbols, to a packet receiver in a wireless communication system. Embodiments presented herein further relate to a method, a packet receiver, a computer program, and a computer program product for reception of symbols from a packet transmitter in a wireless communication system.

Embodiments can enable efficient transmission and reception of symbols of physical layer PDUs with different priorities, not suffering from the issues noted above, or at least where the above noted issues have been mitigated or reduced.

According to a first aspect a method is provided for transmission of symbols to a packet receiver in a wireless communication system. The method is performed by a packet transmitter in the wireless communication system. The method comprises detecting a need to transmit a second stream of symbols having higher priority than a first stream of symbols currently transmitted from the packet transmitter to the packet receiver. The method comprises, in response thereto, transmitting the streams of symbols to the packet receiver by inserting a dedicated tag after the recent-most transmitted symbol of the first stream of symbol, then, following the dedicated tag, inserting symbols of the second stream of symbols, and lastly inserting any remaining symbols of the first stream of symbols. The dedicated tag informs the packet receiver that the first stream of symbols is subjected to pre-emption.

According to a second aspect there is presented a packet transmitter for transmission of PDUs to a packet receiver in a wireless communication system. The packet transmitter comprises processing circuitry. The processing circuitry is configured to cause the packet transmitter to detect a need to transmit a second stream of symbols having higher priority than a first stream of symbols currently transmitted from the packet transmitter to the packet receiver. The processing circuitry is configured to, in response thereto, transmit the streams of symbols to the packet receiver by inserting a dedicated tag after the recent-most transmitted symbol of the first stream of symbol, then, following the dedicated tag, inserting symbols of the second stream of symbols, and lastly inserting any remaining symbols of the first stream of symbols. The dedicated tag informs the packet receiver that the first stream of symbols is subjected to pre-emption.

According to a third aspect there is presented a packet transmitter for transmission of PDUs to a packet receiver in a wireless communication system. The packet transmitter comprises a detect module configured to detect a need to transmit a second stream of symbols having higher priority than a first stream of symbols currently transmitted from the packet transmitter to the packet receiver. The packet transmitter comprises a transmit module configured to, in response thereto, transmit the streams of symbols to the packet receiver by inserting a dedicated tag after the recent-most transmitted symbol of the first stream of symbol, then, following the dedicated tag, inserting symbols of the second stream of symbols, and lastly inserting any remaining symbols of the first stream of symbols. The dedicated tag informs the packet receiver that the first stream of symbols is subjected to pre-emption.

According to a fourth aspect there is presented a computer program for transmission of symbols to a packet receiver in a wireless communication system, the computer program comprising computer program code which, when run on processing circuitry of a packet transmitter, causes the packet transmitter to perform a method according to the first aspect.

According to a fifth aspect there is presented a method for reception of symbols from a packet transmitter in a wireless communication system. The method is performed by a packet receiver in the wireless communication system. The method comprises receiving a first stream of symbols, the first stream of symbols being fragmented into symbols, and whilst doing so, receiving a dedicated tag after the recent-most received symbol of the first stream of symbol, then, following the dedicated tag, receiving symbols of a second stream of symbols, the second stream of symbols being fragmented into symbols, and lastly receiving any remaining symbols of the first stream of symbols. The dedicated tag informs the packet receiver that the first stream of symbols is subjected to pre-emption.

According to a sixth aspect there is presented a packet receiver for reception of symbols from a packet transmitter in a wireless communication system. The packet receiver comprises processing circuitry. The processing circuitry is configured to cause the packet receiver to receive a first stream of symbols, the first stream of symbols being fragmented into symbols, and whilst doing so, receiving a dedicated tag after the recent-most received symbol of the first stream of symbol, then, following the dedicated tag, receiving symbols of a second stream of symbols, the second stream of symbols being fragmented into symbols, and lastly receiving any remaining symbols of the first stream of symbols. The dedicated tag informs the packet receiver that the first stream of symbols is subjected to pre-emption.

According to a seventh aspect there is presented a packet receiver for reception of symbols from a packet transmitter in a wireless communication system. The packet receiver comprises a receive module configured to receive a first stream of symbols, the first stream of symbols being fragmented into symbols, and whilst doing so, receiving a dedicated tag after the recent-most received symbol of the first stream of symbol, then, following the dedicated tag, receiving symbols of a second stream of symbols, the second stream of symbols being fragmented into symbols, and lastly receiving any remaining symbols of the first stream of symbols. The dedicated tag informs the packet receiver that the first stream of symbols is subjected to pre-emption.

According to an eight aspect there is presented a computer program for reception of symbols from a packet transmitter in a wireless communication system, the computer program comprising computer program code which, when run on processing circuitry of a packet receiver, causes the packet receiver to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously these methods, these packet transmitters, these packet receivers, these computer programs, and this computer program product enable efficient transmission and reception of symbols of physical layer PDUs with different priorities.

Advantageously these methods, these packet transmitters, these packet receivers, these computer programs, and this computer program product do not suffer from the issues noted above, or at least where the above noted issues Advantageously, rather than waiting for the transmission of the current physical layer PDU to finish, the higher-priority physical layer PDU transmission could begin immediately after the transmission of the current symbol is completed.

Advantageously, the waiting time is significantly reduced with respect to the standard approach of waiting for the transmission of an entire physical layer PDU to finish, which can take up to hundreds of microseconds or even milliseconds.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF ILLUSTRATIVE EMBODIMENTS

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
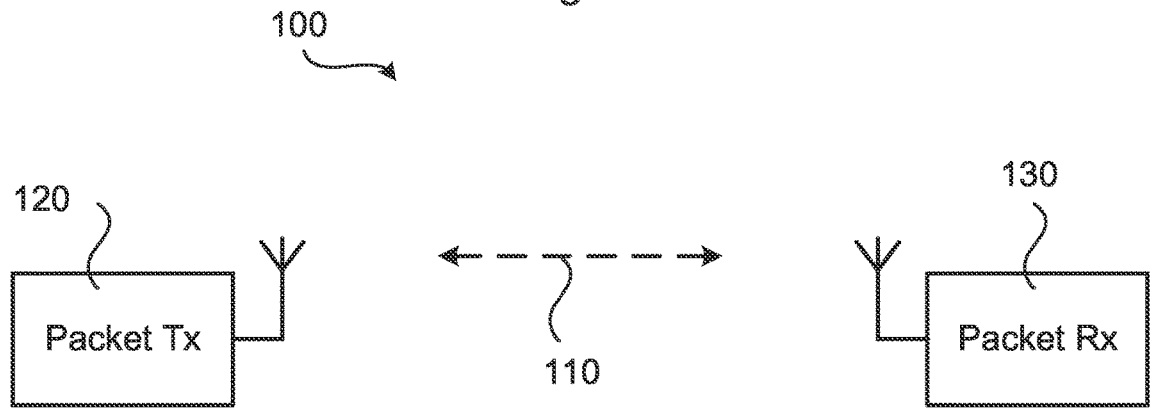
FIG. 1 is a schematic diagram illustrating a wireless communication system according to embodiments.

FIG. 1 is a schematic diagram illustrating a wireless communication system 100 where embodiments presented herein can be applied. In some embodiments, the wireless communication system 100 is a wireless industrial communication system. The wireless communication system 100 comprises a packet transmitter (Tx) 120 and a packet receiver (Rx) 130. The packet transmitter 120 and the packet receiver 130 are configured to communicate with each other over a wireless communication channel, such as a radio channel, as indicated by reference numeral 110. Without loss of generality it is hereinafter assumed that the packet transmitter 120 is to transmit physical layer PDUs to the packet receiver 130. In some examples, each of the packet transmitter 120 and the packet receiver 130 is part of, integrated with, or collocated with, a sensor, gateway, breaker, protector, or any combination thereof, in the wireless communication system 100.

Figure 2:
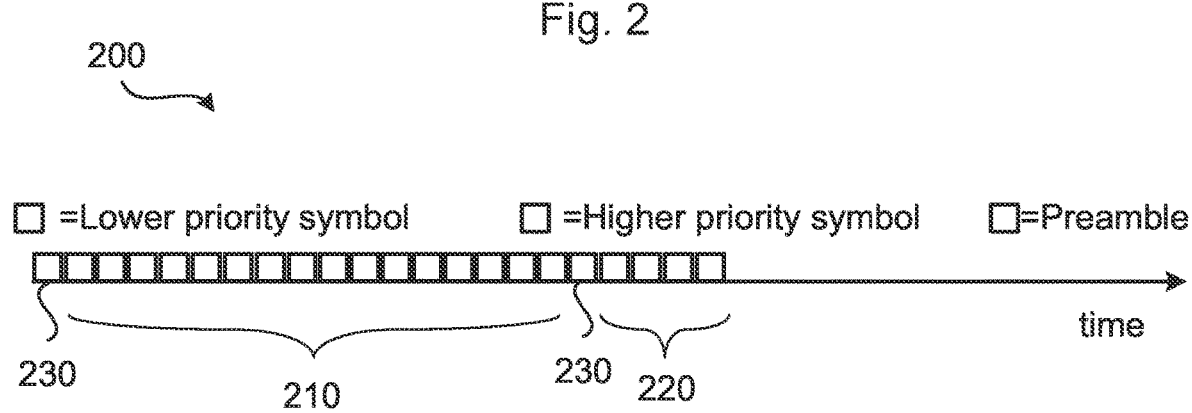
FIG. 2 is a schematic illustration of transmission of symbols of two physical layer PDUs according to state of the art.

As noted above, in typical wireless communication systems 100, there is no pre-emption once a transmission of physical layer PDU has started. FIG. 2 at 200 schematically illustrates two streams 210, 220 of symbols, each stream of which representing one physical layer PDU being transmitted, and where the two streams 210, 220 of symbols are separated by preambles 230. Thus, as illustrated in FIG. 2, if a higher priority physical layer PDU enters the transmission queue at the packet transmitter 120 whilst the communication channel is busy, the packet transmitter 120 must wait for the completion of the ongoing transmission, i.e., of all symbols of the first physical layer PDU, before starting transmitting the symbols of the second physical layer PDU with higher priority.

The herein disclosed embodiments enable the waiting time of higher priority physical layer PDUs to be lowered and rely on a customized physical (PHY) layer, specifically targeted at low-latency and high-reliability industrial wireless communication systems 100.

Orthogonal Frequency-Division Multiplexing (OFDM) modulation, according to which bitstreams of data are coded into a discrete number of OFDM symbols, will hereinafter be used as an illustrative example. However, as the skilled person will understand, the herein disclosed embodiments are also applicable to wireless communication systems 100 that do not consider OFDM. Indeed, in most wireless communication systems 100 a physical layer PDU is at the PHY layer split into multiple consecutive symbols in the time domain, the difference just being the shape and length of these symbols.

The embodiments disclosed herein thus relate to mechanisms for transmission of symbols to a packet receiver 130 in a wireless communication system 100 and reception of symbols from a packet transmitter 120 in a wireless communication system 100. In order to obtain such mechanisms there is provided a packet transmitter 120, a method performed by the packet transmitter 120, a computer program product comprising code, for example in the form of a computer program, that when run on processing circuitry of the packet transmitter 120, causes the packet transmitter 120 to perform the method. In order to obtain such mechanisms there is further provided a packet receiver 130, a method performed by the packet receiver 130, and a computer program product comprising code, for example in the form of a computer program, that when run on processing circuitry of the packet receiver 130, causes the packet receiver 130 to perform the method.

The herein disclosed embodiments are based on fragmentation of a physical layer PDU into symbols at the PHY layer for pre-emption. The packet transmitter 120 is then configured to, rather than waiting for the transmission of symbols of a current physical layer PDU to finish, start transmission of symbols of a higher-priority physical layer PDU immediately after the transmission of the current symbol of the current physical layer PDU is completed. The transmission time for a single symbol, such as an OFDM symbol, is generally very short, ranging from 4 µs in IEEE 802.11g to even shorter times in customized systems. Hence, the waiting time is significantly reduced with respect to traditional approaches of waiting for the transmission of an entire physical layer PDU, which can take up to hundreds of microseconds or even milliseconds.

One potential issue with fragmenting a physical layer PDU of symbols into physical layer PDUs having one singular symbol each that can be pre-empted is that each and every symbol might not contain any header information. This means that in order for a packet receiver 130 to successfully decode a physical layer PDU, all the symbols of the physical layer PDU must be received as a continuous stream, since otherwise the packet receiver 130 has no possibility to discriminate between symbols belonging to different physical layer PDUs.

Figure 3:
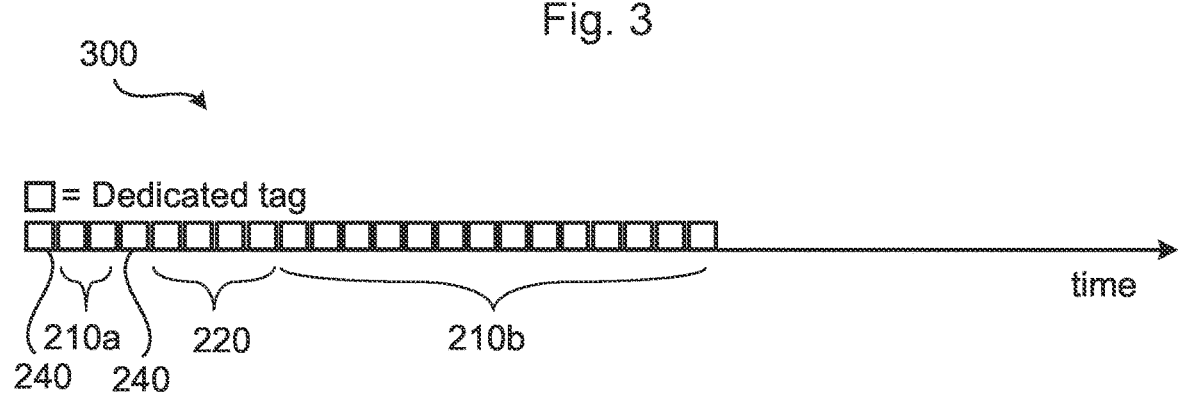
FIG. 3 is a schematic illustration of transmission of symbols of two physical layer PDUs using pre-emption according to an embodiment.

According to the proposed inventive concept a special preamble, hereinafter referred to as a dedicated tag, is therefore by the packet transmitter 120 transmitted whenever the transmission of a lower-priority physical layer PDU is pre-empted by a higher-priority physical layer PDU. An example of such a pre-empted transmission stream is shown in FIG. 3. FIG. 3 at 300 schematically illustrates, in terms of symbols, two sequences of symbols. Each sequence represents one physical layer PDU being transmitted. After a preamble 230, a first part 210a of the first stream of symbols is transmitted, then a dedicated tag 240 (for example in the form of one or more symbols) is transmitted, then the second stream 220 of symbols is transmitted, and then the remaining symbols of the first stream are transmitted in a second part 210b of the first stream of symbols. When the packet receiver 130 detects such a dedicated tag, the packet receiver 130 understands that pre-emption is ongoing, pauses the processing of the currently received stream of symbols starts the processing of the symbols of the new stream.

Figure 4:
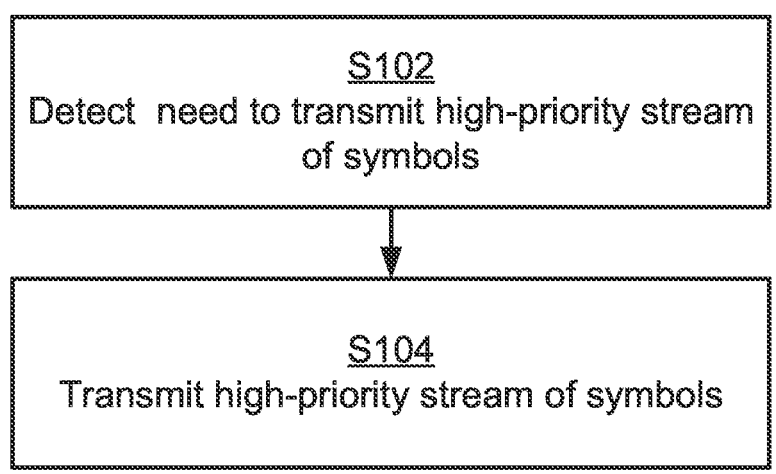
FIGS. 4, 5, 6, 7 are flowcharts of methods according to embodiments.

Reference is now made to FIG. 4 illustrating a method for transmission of symbols to a packet receiver 130 in a wireless communication system 100 as performed by the packet transmitter 120 according to an embodiment.

It is assumed that the packet transmitter 120 transmits a first stream of symbols when there is a need to transmit a second stream of symbols having higher priority than the first stream of symbols. Each stream of symbols might belong to one or more respective physical layer PDUs as transmitted from the packet transmitter 120 to the packet receiver 130. Hence, in some embodiments, each stream pf symbols is part of a respective physical layer PDU. In particular, the packet transmitter 120 is configured to perform action S102:

S102: The packet transmitter 120 detects a need to transmit a second stream of symbols to the packet receiver 130. The second stream of symbols has higher priority than a first stream of symbols currently transmitted from the packet transmitter 120 to the packet receiver 130.

The fragmentation of symbols into symbols at the physical layer of the wireless communication system 100 is utilized for implementing pre-emption. As noted above, in some examples the symbols are OFDM symbols. A dedicated tag is, by the symbol transmitter, inserted to inform the packet receiver 130 that such a pre-emption is taking place. As noted above, in some examples the dedicated tag is a special preamble. In particular, the packet transmitter 120 is configured to perform action S104.

S104: The packet transmitter 120 in response thereto (i.e., in response to having detected the need in S102) transmits the streams of symbols to the packet receiver 130. The packet transmitter 120 inserts a dedicated tag. In some examples the dedicated tag is inserted to be placed in the stream of symbols after the recent-most transmitted symbol of the first stream of symbol. Then, following the dedicated tag, the packet transmitter 120 inserts symbols of the second stream of symbols. The packet transmitter 120 lastly inserts any remaining symbols of the first stream of symbols. The dedicated tag informs the packet receiver 130 that the first stream of symbols is subjected to pre-emption.

Embodiments relating to further details of transmission of symbols to a packet receiver 130 in a wireless communication system 100 as performed by the packet transmitter 120 will now be disclosed.

There may be different ways to mark the end of the last symbol of the first stream of symbols. According to an embodiment, a predetermined number of symbols of the second stream of symbols are inserted following the dedicated tag. Both the packet transmitter 120 and the packet receiver 130 are aware of this predetermined number. In some examples the value of the predetermined number is fixed. In other examples the value of the predetermined number is communicated in advance (or at least in the beginning of the transmission of the symbols of the second stream of symbols) from the packet transmitter 120 to the packet receiver 130. In other aspect, a second dedicated tag is inserted following the last symbol of the second stream of symbols. Upon detecting this second dedicated tag the packet receiver 130 knows that the next symbol belongs to the first stream pf symbols.

Further aspects, examples, and embodiments, relating to the packet transmitter 120 will be disclosed below.

Figure 5:
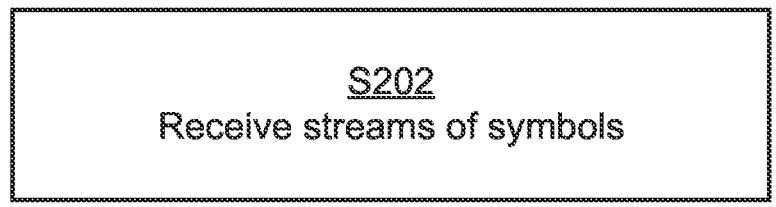

Reference is now made to FIG. 5 illustrating a method for reception of symbols from a packet transmitter 120 in a wireless communication system 100 as performed by the packet receiver 130 according to an embodiment.

As noted above, it is assumed that the packet transmitter 120 transmits a first stream of symbols when there is a need to transmit a second stream of symbols having higher priority than the first stream of symbols. It is here further assumed that the packet receiver 130 receives this first stream of symbols. Hence, the packet receiver 130 is configured to perform action S202.

S202: The packet receiver 130 receives a first stream of symbols. As noted above, the first stream of symbols is fragmented into symbols. Whilst receiving the first stream of symbols, the packet receiver 130 receives a dedicated tag after the recent-most received symbol of the first stream of symbol. Then, following the dedicated tag, the packet receiver 130 receives symbols of a second stream of symbols. As noted above, the second stream of symbols is fragmented into symbols. The packet receiver 130 lastly receives any remaining symbols of the first stream of symbols. As noted above, the dedicated tag informs the packet receiver 130 that the first stream of symbols is subjected to pre-emption.

Embodiments relating to further details of reception of symbols from a packet transmitter 120 in a wireless communication system 100 as performed by the packet receiver 130 will now be disclosed.

As noted above, there may be different ways to mark the end of the last symbol of the first stream of symbols. According to an embodiment, a predetermined number of symbols of the second stream of symbols are received following the dedicated tag. Both the packet transmitter 120 and the packet receiver 130 are aware of this predetermined number. As noted above, in other aspect, a second dedicated tag is inserted following the last symbol of the second stream of symbols. Upon detecting this second dedicated tag the packet receiver 130 knows that the next symbol belongs to the first stream pf symbols.

Further aspects, examples, and embodiments, relating to the packet transmitter 120 as well as the packet receiver 130 will be disclosed next.

Figure 6:
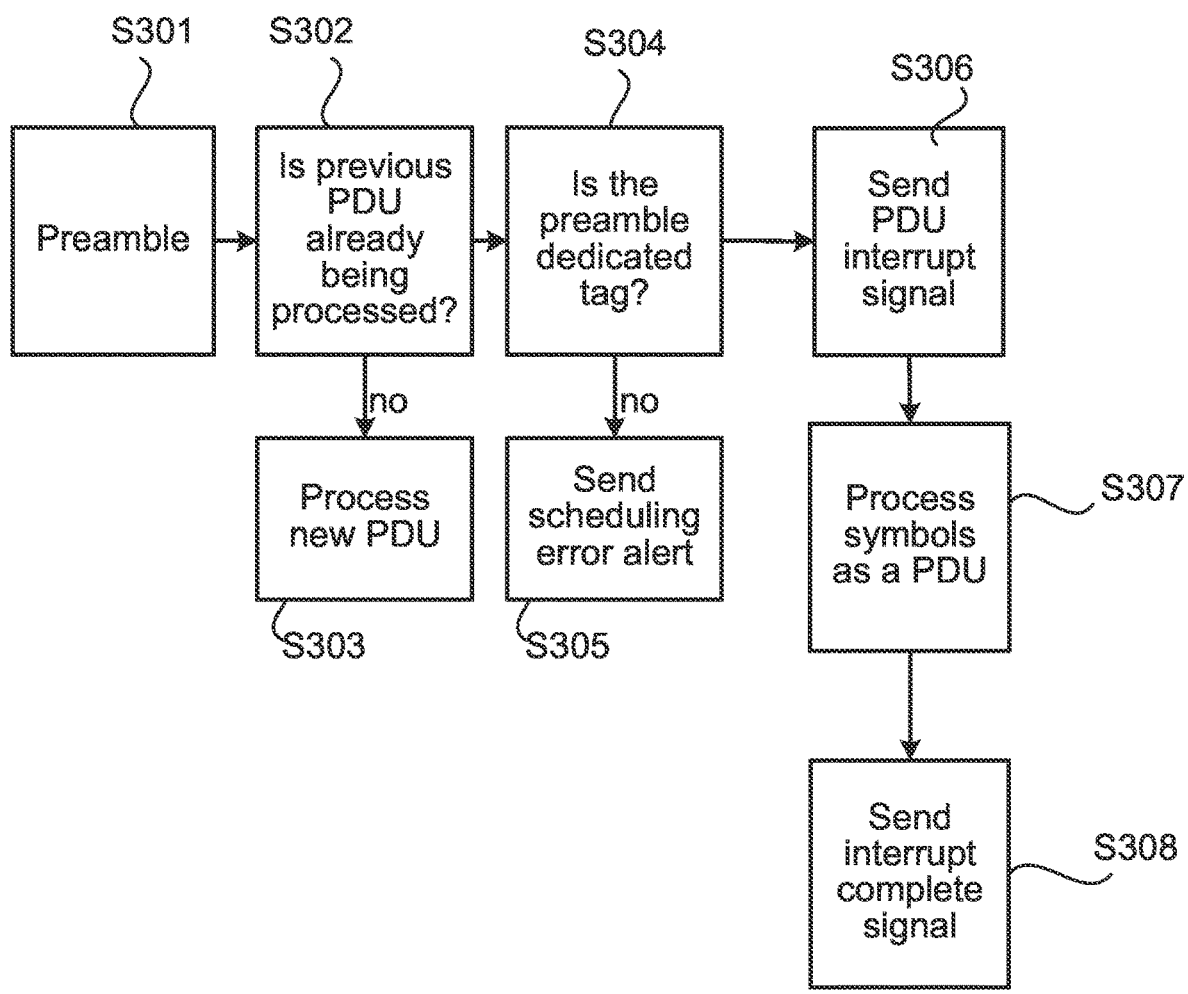

The packet receiver 130 might thus continuously scan the stream of symbols for the dedicated tag in each physical layer PDU being received. According to an embodiment, when such a dedicated tag is detected, a process as according to the flowchart of FIG. 6 is performed.

S301: The packet receiver 130 detects a preamble.

S302: The packet receiver 130 checks if a stream of symbols belonging to another physical layer PDU is currently being processed. If yes, action S303 is entered and if no, action S304 is entered.

S303: The packet receiver 130 starts normal physical layer PDU processing of the symbols following the dedicated tag.

S304: The packet receiver 130 checks if the detected preamble is the above disclosed dedicated tag. If yes, action S305 is entered and if no, action S306 is entered.

S305: The packet receiver 130 signals an error in the scheduling and the current physical layer PDU processing is interrupted.

S306: The packet receiver 130 sends a "PDU interrupt" signal to the functional block in the packet receiver 130 that handles addresses in the RAM, so that the new high-priority stream of symbols can occupy a different address space than the currently processed stream of symbols.

S307: The symbols following the dedicated tag are processed and stored in the new address space.

S308: Once all the symbols of the high-priority stream of symbols have been processed, an "interrupt complete"

signal is sent to the address handling block to resume processing of the original low-priority stream of symbols.

Figure 7:
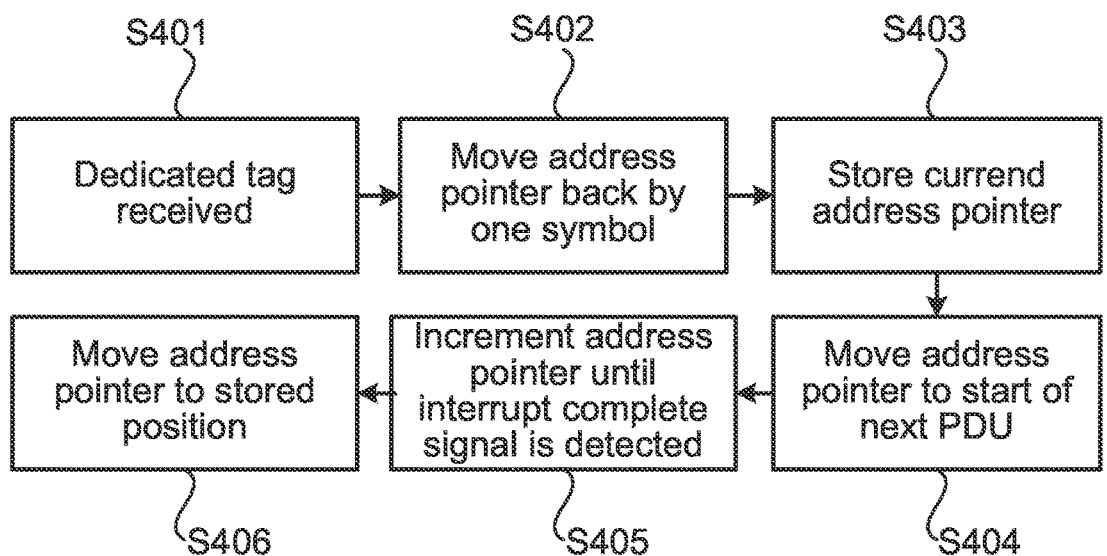

After a PDU has been processed, the data content of the symbols is written to a RAM which is accessible both by hardware and software. To distinguish between the data of the low-priority stream of symbols and the high-priority stream of symbols, the data of these two streams is written in different addresses in the RAM, which might be handled by sending "PDU interrupt" and "interrupt complete" signals to the address-handling block. However, once the processing of a physical layer PDU has begun, all incoming symbols will be interpreted as data. Hence, the aforementioned dedicated tag would still be interpreted as data for the low-priority physical layer PDU, since its processing began before the "PDU interrupt" signal is sent. To solve this issue, as illustrated in the flowchart of FIG. 7, when the "PDU interrupt" signal is received (S401), the address-handling block will first move the pointer back by one symbol to discard the dedicated tag (S402), store the current address pointer (S403), move the address pointer to the start of the next PDU (S404), increment the address pointer until an "interrupt complete" signal is detected, and then move the address pointer back to the stored position (S405).

The address interrupt process enables the packet receiver 130 to switch between different streams of symbols, and to store information on partially decoded physical layer PDUs. The software layers are not informed of this behavior until a physical layer PDU has been completely decoded and need therefore not to be aware of the symbol-level fragmentation or the pre-emption mechanism.

The first stream of symbols might be subjected to pre-emption at the physical layer itself or at a protocol layer higher than the physical layer. Aspects relating thereto will now be disclosed with reference to FIG. 8 and FIG. 9.

Figure 8:
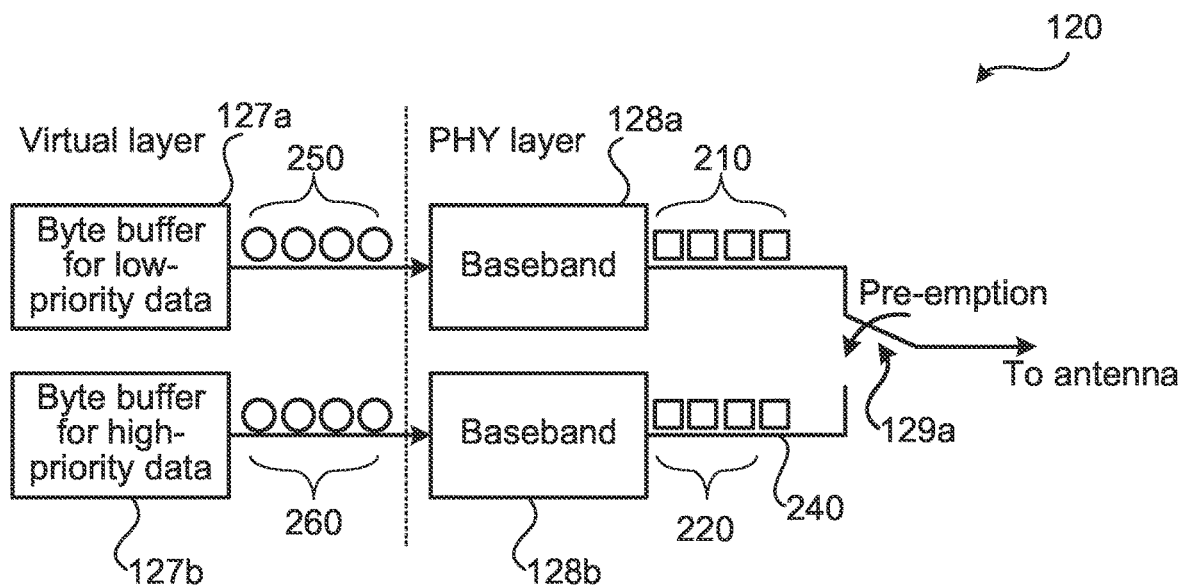
FIGS. 8 and 9 are schematic diagrams of buffer handling at a packet transmitter according to embodiments.

The pre-emption mechanism is implemented at the physical layer (i.e., protocol layer 1), where the baseband generates symbols from a stream of bytes coming from an input buffer at an upper layer (i.e., a protocol layer higher than protocol layer 1; hereinafter denoted as a virtual layer). A packet transmitter 120 for this alternative is schematically illustrated in FIG. 8. This alternative requires the packet transmitter 120 to have two baseband modules 128a, 128b connected to two input buffers 127a, 127b; one for high priority stream of bytes 260 and one for low priority stream of bytes 260, and a selector 129a connected to the antenna, where the selector is configured to switch between the two baseband modules when pre-emption is required. The first symbol of the high-priority stream of symbols 220 which takes the precedence over the low-priority stream of symbols 210 is the dedicated tag 240 needed by the packet receiver 130 to recognize that pre-emption is ongoing.

Figure 9:
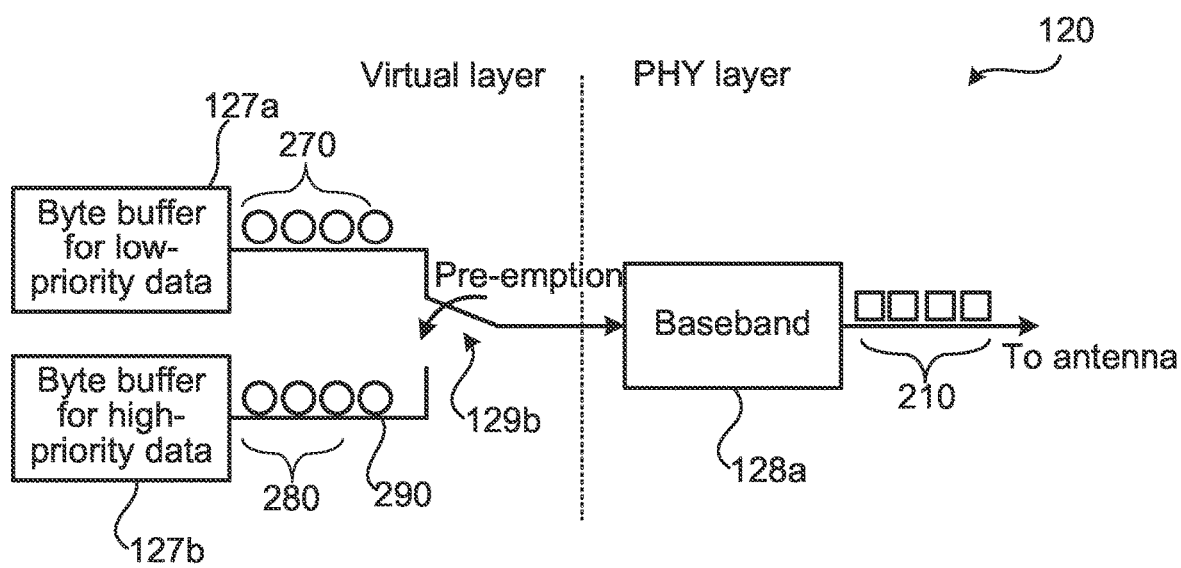

Alternatively, pre-emption is implemented directly at the virtual layer. Thus, in some embodiments, the packets are fragmented at byte-level. A packet transmitter 120 for this alternative is schematically illustrated in FIG. 9. A selector 129b is configured to switch from a stream of bytes 270 coming from a low-priority buffer 127a to a stream of bytes 280 coming from a high-priority buffer 127b. According to this alternative only one single baseband module 128a is thus required. For the packet receiver 130 to recognize that pre-emption is on-going, the dedicated tag 290 is inserted at the beginning of the high-priority byte stream 280. This alternative could allow for a lower usage of hardware resources (e.g., only one baseband module) and a lower pre-emption time (since bytes typically are shorter than symbols).

Figure 10:
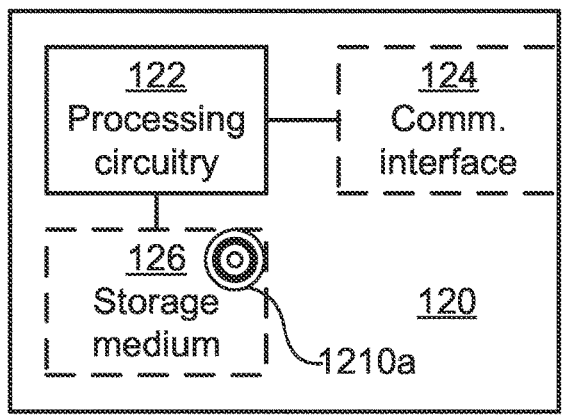
FIG. 10 is a schematic diagram showing functional units of a packet transmitter according to an embodiment.

FIG. 10 schematically illustrates, in terms of a number of functional units, the components of a packet transmitter 120 according to an embodiment. Processing circuitry 122 is provided using any combination of one or more of a suitable central processing unit (CPU), multiprocessor, microcontroller, digital signal processor (DSP), etc., capable of executing software instructions stored in a computer program product 1122a (as in FIG. 12), e.g. in the form of a storage medium 126. The processing circuitry 122 may further be provided as at least one application specific integrated circuit (ASIC), or field programmable gate array (FPGA).

Particularly, the processing circuitry 122 is configured to cause the packet transmitter 120 to perform a set of operations, or actions, as disclosed above. For example, the storage medium 126 may store the set of operations, and the processing circuitry 122 may be configured to retrieve the set of operations from the storage medium 126 to cause the packet transmitter 120 to perform the set of operations. The set of operations may be provided as a set of executable instructions. Thus the processing circuitry 122 is thereby arranged to execute methods as herein disclosed.

The storage medium 126 may also comprise persistent storage, which, for example, can be any single one or combination of magnetic memory, optical memory, solid state memory or even remotely mounted memory.

The packet transmitter 120 may further comprise a communications interface 124 for communications with the packet receiver 130. As such the communications interface 124 may comprise one or more transmitters and receivers, comprising analogue and digital components.

The processing circuitry 122 controls the general operation of the packet transmitter 120 e.g. by sending data and control signals to the communications interface 124 and the storage medium 126, by receiving data and reports from the communications interface 124, and by retrieving data and instructions from the storage medium 126. Other components, as well as the related functionality, of the packet transmitter 120 are omitted in order not to obscure the concepts presented herein.

Figure 11:
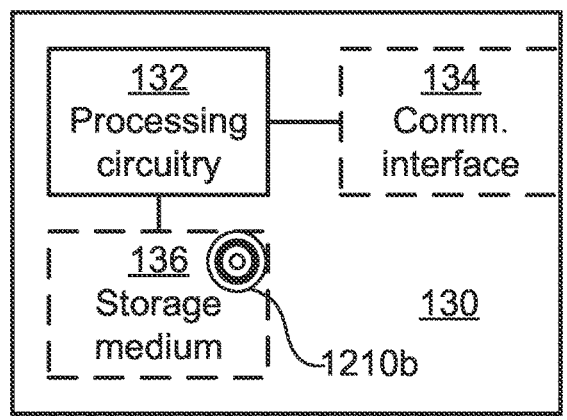
FIG. 11 is a schematic diagram showing functional units of a packet receiver according to an embodiment.

FIG. 11 schematically illustrates, in terms of a number of functional units, the components of a packet receiver 130 according to an embodiment. Processing circuitry 132 is provided using any combination of one or more of a suitable central processing unit (CPU), multiprocessor, microcontroller, digital signal processor (DSP), etc., capable of executing software instructions stored in a computer program product 1122b (as in FIG. 12), e.g. in the form of a storage medium 136. The processing circuitry 132 may further be provided as at least one application specific integrated circuit (ASIC), or field programmable gate array (FPGA).

Particularly, the processing circuitry 132 is configured to cause the packet receiver 130 to perform a set of operations, or actions, as disclosed above. For example, the storage medium 136 may store the set of operations, and the processing circuitry 132 may be configured to retrieve the set of operations from the storage medium 136 to cause the packet receiver 130 to perform the set of operations. The set of operations may be provided as a set of executable instructions. Thus the processing circuitry 132 is thereby arranged to execute methods as herein disclosed.

The storage medium 136 may also comprise persistent storage, which, for example, can be any single one or combination of magnetic memory, optical memory, solid state memory or even remotely mounted memory.

The packet receiver 130 may further comprise a communications interface 134 for communications with the packet transmitter 120. As such the communications interface 134 may comprise one or more transmitters and receivers, comprising analogue and digital components.

The processing circuitry 132 controls the general operation of the packet receiver 130, e.g., by sending data and control signals to the communications interface 134 and the storage medium 136, by receiving data and reports from the communications interface 134, and by retrieving data and instructions from the storage medium 136. Other components, as well as the related functionality, of the packet receiver 130 are omitted in order not to obscure the concepts presented herein.

Figure 12:
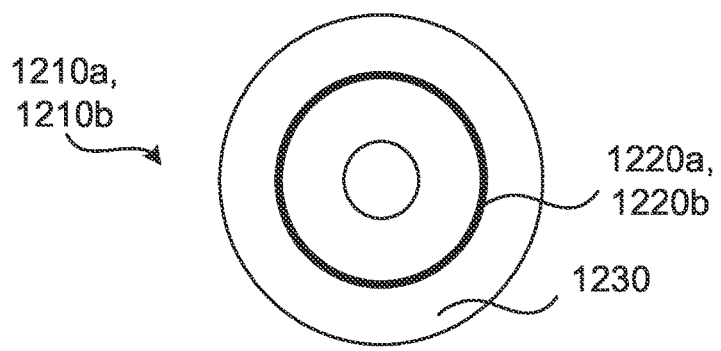
FIG. 12 shows one example of a computer program product comprising computer readable means according to an embodiment.

FIG. 12 shows one example of a computer program product 1122a, 1122b comprising computer readable means 1126. On this computer readable means 1126, a computer program 1124a can be stored, which computer program 1124a can cause the processing circuitry 122 and thereto operatively coupled entities and devices, such as the communications interface 124 and the storage medium 126, to execute methods according to embodiments described herein. The computer program 1124a and/or computer program product 1122a may thus provide means for performing any actions of the packet transmitter 120 as herein disclosed. On this computer readable means 1126, a computer program 1124b can be stored, which computer program 1124b can cause the processing circuitry 132 and thereto operatively coupled entities and devices, such as the communications interface 134 and the storage medium 136, to execute methods according to embodiments described herein. The computer program 1124b and/or computer program product 1122b may thus provide means for performing any actions of the packet receiver 130 as herein disclosed.

In the example of FIG. 12, the computer program product 1122a, 1122b is illustrated as an optical disc, such as a CD (compact disc) or a DVD (digital versatile disc) or a Blu-Ray disc. The computer program product 1122a, 1122b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1124a, 1124b is here schematically shown as a track on the depicted optical disk, the computer program 1124a, 1124b can be stored in any way which is suitable for the computer program product 1122a, 1122b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method for preparing transmission of physical layer protocol data units (PDUs), the method being performed by a packet transmitter in a wireless communication system, the method comprising:
    detecting a need to transmit a second stream of symbols having higher priority than a first stream of symbols currently being transmitted from the packet transmitter to a packet receiver, wherein the first and second streams of symbols are each part of a respective physical layer PDU;
    inserting a dedicated tag after a recent-most transmitted symbol of the first stream of symbols, the dedicated tag indicative of the first stream of symbols being subjected to pre-emption at the physical layer; and
    inserting symbols of the second stream of symbols following the dedicated tag for transmission of the second stream of symbols to the packet receiver, wherein:
        any remaining symbols of the first stream of symbols are inserted after the second stream of symbols,
        a predetermined number of symbols of the second stream of symbols is inserted following the dedicated tag,
        inserting the symbols of the second stream of symbols comprises configuring a selector coupled to an output of a first baseband module and an output of a second baseband module to switch from selecting the output of the first baseband module to selecting the output of the second baseband module.

2. The method according to claim 1, further comprising transmitting the second stream of symbols towards the packet receiver.

3. The method according to claim 1, wherein the packet transmitter is a sensor, gateway, breaker, protector, or any combination thereof.

4. The method according to claim 1, wherein the symbols are OFDM symbols.

5. The method according to claim 1, wherein the dedicated tag is a special preamble.

6. The method according to claim 1, wherein the wireless communication system is a wireless industrial communication system.

7. The method according to claim 1, wherein the dedicated tag is indicative of the first stream of symbols being subjected to the pre-emption at the physical layer on a symbol-by-symbol basis.

8. The method according to claim 1, wherein:
    the first stream of symbols is generated by the first baseband module; and
    the second stream of symbols is generated by the second baseband module.

9. A method for reception of physical layer protocol data units (PDUs), the method being performed by a packet receiver in a wireless communication system, the method comprising:
    receiving a first stream of symbols, the first stream of symbols being fragmented into symbols, wherein the first stream of symbol is part of a physical layer PDU;
    receiving a dedicated tag after a recent-most received symbol of the first stream of symbols, the dedicated tag indicative of the first stream of symbols being subjected to pre-emption at the physical layer; and
    receiving symbols of a second stream of symbols following the dedicated tag, the second stream of symbols being fragmented into symbols and being part of a second physical layer PDU, wherein:
        any remaining symbols of the first stream of symbols are received after the symbols of the second stream of symbols, and
        a predetermined number of symbols of the second stream of symbols is received following the dedicated tag.

10. The method according to claim 9, wherein the packet receiver is a sensor, gateway, breaker, protector, or any combination thereof.

11. The method according to claim 9, wherein the symbols are OFDM symbols.

12. The method according to claim 9, wherein the dedicated tag is a special preamble.

13. The method according to claim 9, wherein the wireless communication system is a wireless industrial communication system.

14. The method according to claim 9, wherein the dedicated tag is indicative of the first stream of symbols being subjected to the pre-emption at the physical layer on a symbol-by-symbol basis.

15. A packet transmitter in a wireless communication system, the packet transmitter comprising processing circuitry for preparing transmission of physical layer protocol data units (PDUs), the processing circuitry being configured to cause the packet transmitter to:
- detect a need to transmit a second stream of symbols having higher priority than a first stream of symbols currently being transmitted from the packet transmitter to a packet receiver, wherein the first and second streams of symbols are each part of a respective physical layer PDU;
- insert a dedicated tag after a recent-most transmitted symbol of the first stream of symbols, the dedicated tag indicative of the first stream of symbols being subjected to pre-emption at the physical layer; and
- insert symbols of the second stream of symbols following the dedicated tag for transmission of the second stream of symbols to the packet receiver by configuring a selector coupled to an output of a first baseband module and an output of a second baseband module to switch from selecting the output of the first baseband module to selecting the output of the second baseband module, wherein
  - any remaining symbols of the first stream of symbols are inserted after the second stream of symbols,
  - a predetermined number of symbols of the second stream of symbols is inserted following the dedicated tag.

16. The packet receiver according to claim 15, wherein the dedicated tag is indicative of the first stream of symbols being subjected to the pre-emption at the physical layer on a symbol-by-symbol basis.

17. A packet receiver in a wireless communication system comprising processing circuitry for reception of physical layer protocol data units (PDUs) the packet receiver, the processing circuitry being configured to cause the packet receiver to:
- receive a first stream of symbols, the first stream of symbols being fragmented into symbols, wherein the first stream of symbols is part of a first physical layer PDU;
- receive a dedicated tag after a recent-most received symbol of the first stream of symbols, the dedicated tag indicative of the first stream of symbols being subjected to pre-emption at the physical layer; and
- receive a second stream of symbols after the dedicated tag, wherein the second stream of symbols is part of a second physical layer PDU, wherein
  - any remaining symbols of the first stream of symbols are received after the symbols of the second stream of symbols, and
  - a predetermined number of symbols of the second stream of symbols is received following the dedicated tag.

18. A non-transitory computer readable medium storing a computer program for preparing transmission of physical layer protocol data units (PDUs), the computer program comprising computer code which, when run on processing circuitry of a packet transmitter in a wireless communication system, causes the packet transmitter to:
- detect a need to transmit a second stream of symbols having higher priority than a first stream of symbols currently being transmitted from the packet transmitter to a packet receiver, wherein the first and second streams of symbols are each part of a respective physical layer PDU;
- insert a dedicated tag after a recent-most transmitted symbol of the first stream of symbols, the dedicated tag indicative of the first stream of symbols being subjected to pre-emption at the physical layer; and
- insert symbols of the second stream of symbols following the dedicated tag for transmission of the second stream of symbols to the packet receiver by configuring a selector coupled to an output of a first baseband module and an output of a second baseband module to switch from selecting the output of the first baseband module to selecting the output of the second baseband module, wherein
  - any remaining symbols of the first stream of symbols are inserted after the second stream of symbols,
  - a predetermined number of symbols of the second stream of symbols is inserted following the dedicated tag.

19. The non-transitory computer readable medium according to claim 18, wherein the dedicated tag is indicative of the first stream of symbols being subjected to the pre-emption at the physical layer on a symbol-by-symbol basis.

20. A non-transitory computer readable medium storing a computer program for reception of physical layer protocol data units (PDUs), the computer program comprising computer code which, when run on processing circuitry of a packet receiver in a wireless communication system, causes the packet receiver to:
- receive a stream of symbols that is fragmented into symbols, wherein the stream of symbols is part of a physical layer PDU; and
- receive a dedicated tag after a recent-most received symbol of the stream of symbols, the dedicated tag indicative of the stream of symbols being subjected to pre-emption at the physical layer; and
- receive symbols of a further stream of symbols following the dedicated tag, the further stream of symbols being fragmented into symbols and being part of a further physical layer PDU, wherein:
  - any remaining symbols of the stream of symbols are received after the symbols of the further stream of symbols, and
  - a predetermined number of symbols of the further stream of symbols is received following the dedicated tag.

21. The non-transitory computer readable medium according to claim 20, wherein the dedicated tag is indicative of the stream of symbols being subjected to the pre-emption at the physical layer on a symbol-by-symbol basis.

* * * * *